US008833337B2

(12) United States Patent
Xykis et al.

(10) Patent No.: US 8,833,337 B2
(45) Date of Patent: Sep. 16, 2014

(54) DRIVING SYSTEM FOR ENGINE AUXILIARY POWER

(71) Applicant: Power Solutions International, Inc., Wood Dale, IL (US)

(72) Inventors: Constantine Xykis, Hartland, WI (US); Brian Manning, Elk Grove, IL (US); Gary Winemaster, Wood Dale, IL (US)

(73) Assignee: Power Solutions International, Inc., Wood Dale, IL (US)

( * ) Notice: Subject to any disclaimer, the term of this patent is extended or adjusted under 35 U.S.C. 154(b) by 0 days.

(21) Appl. No.: 13/738,279

(22) Filed: Jan. 10, 2013

(65) Prior Publication Data

US 2014/0190284 A1      Jul. 10, 2014

(51) Int. Cl.
  *F02B 67/06*      (2006.01)
  *F16H 7/02*       (2006.01)
  *B60K 25/02*      (2006.01)

(52) U.S. Cl.
  CPC .......... *F16H 7/023* (2013.01); *B60K 2025/022* (2013.01)
  USPC ...................... 123/198 C; 474/150

(58) Field of Classification Search
  CPC ...................... B60K 2025/02; B60K 2025/022
  USPC ............. 74/15.63; 123/198 R, 195 R, 198 C; 474/150; 3/15.63
  See application file for complete search history.

(56) References Cited

U.S. PATENT DOCUMENTS

| 2,911,961 | A | * | 11/1959 | McRae ...................... 123/41.11 |
| 3,483,763 | A |   | 12/1969 | Enters |
| RE27,177  | E |   | 9/1971  | Schlapman et al. |
| 3,828,878 | A | * | 8/1974  | Clapsaddle, Jr. ............. 180/53.7 |
| 4,031,761 | A | * | 6/1977  | Fisher et al. ................. 74/15.63 |
| 4,036,029 | A |   | 7/1977  | Francis |
| 4,685,340 | A | * | 8/1987  | Shust et al. ....................... 74/11 |
| 4,763,744 | A |   | 8/1988  | McVicar et al. |
| 4,838,101 | A | * | 6/1989  | Dobberpuhl et al. ........ 74/15.63 |
| 4,864,878 | A | * | 9/1989  | Pralle .............................. 74/15.6 |
| 4,884,949 | A | * | 12/1989 | Eakin ........................ 416/170 R |
| 5,040,615 | A |   | 8/1991  | Fletcher |
| 5,346,018 | A |   | 9/1994  | Koster |
| 7,004,864 | B2 |  | 2/2006  | Hotta |

FOREIGN PATENT DOCUMENTS

| EP | 0 709 560   | 5/1996 |
| JP | S62 60931   | 3/1987 |
| JP | H 10 141079 | 5/1998 |

OTHER PUBLICATIONS

Document with six images of a Nissan fuel-injected K21s engine.

* cited by examiner

*Primary Examiner* — David M Fenstermacher
*Assistant Examiner* — Terence Boes
(74) *Attorney, Agent, or Firm* — McDonnell Boehnen Hulbert & Berghoff LLP

(57) ABSTRACT

Systems and methods for driving engine auxiliaries are provided. A front drive power take-off system is used to drive an auxiliary unit mounted on the engine. A pulley and belt drive assembly includes a drive sprocket mounted on the engine crankshaft, a toothed belt interconnecting the drive sprocket, and a pulley mounted on a drive shaft of the auxiliary unit to transmits power from crankshaft to the auxiliary unit.

9 Claims, 2 Drawing Sheets

DRIVING SYSTEM FOR ENGINE AUXILIARY POWER

BACKGROUND

Motor-driven vehicles generally include an engine with a transmission for driving the wheels of the engine. Often the engine has a significant excess of power available to drive auxiliary systems that are required to perform the vehicle's intended services. A power take-off (PTO) system typically delivers rotary power from the engine to auxiliary systems via a PTO shaft that allow the auxiliaries to draw power from the engine. In some cases, auxiliary systems, such as hydraulic systems for running non-drive components of industrial, agricultural and construction vehicles, require substantial amounts of power from the engine. In many instances, the space available within the engine compartment is limited, which creates a design challenge to implement a PTO system that can deliver enough power to drive auxiliary systems that require up to all the power of the engine.

PTO systems may be positioned so as to take power from the front end of the engine crankshaft (front drive PTO) or the rear end of the engine crankshaft (rear drive PTO). For front drive PTO, an integrated gear-driven or a chain-driven PTO system is often used to take power from the engine crankshaft. These systems, however, are usually bulky, integral parts of the engine that are difficult to fit into a vehicle that requires a compact engine configuration, such as a forklift. These PTO systems are also difficult to service, and deliver only a fraction of the power supplied from the associated engine.

Accordingly, the inventors have identified a need in the art for a more robust front drive PTO system for proving power to auxiliary systems in a compact environment.

Unless otherwise indicated herein, the foregoing description in this section is not prior art to the claims in this application and is not admitted to be prior art by inclusion in this section.

SUMMARY

In one aspect, the invention is directed to a system for driving an auxiliary unit from the front end of an engine. The system includes a drive sprocket mounted on an engine crankshaft at the front end of the engine; an auxiliary shaft for driving the auxiliary unit, wherein the auxiliary unit is mounted on the engine and the shaft is spaced in parallel relation to the crankshaft; an auxiliary pulley mounted on the auxiliary shaft that is adapted for driving the auxiliary unit; a toothed drive belt interconnecting the drive sprocket and the auxiliary pulley to transmit power from the drive sprocket to the pulley; and a support structure that supports the crankshaft against a transverse load asserted by the drive belt. In particular embodiments, the toothed belt may be a synchronous belt. The system may also include a woodruff key associated with the crankshaft, wherein the woodruff key is configured to fit within a corresponding annular keyway in the drive sprocket. Also, the drive sprocket may be press fit on to the crankshaft.

In a further aspect, the invention is directed to a method for taking power off the front of an engine to power an auxiliary unit. The method includes mounting the auxiliary unit on the side of the engine, wherein an auxiliary power take-off shaft of the auxiliary unit is substantially parallel to an engine crankshaft; delivering substantially all of the power from the engine from a front end of the crankshaft to the auxiliary unit via a pulley and toothed belt system, wherein the pulley and toothed belt system comprises a pulley mounted on a power take-off (PTO) shaft, a sprocket mounted on the crankshaft, and a toothed belt rotatably connecting the pulley and the sprocket. In various aspects of the invention, one or both of the PTO shaft and the crankshaft are supported with a removable bracket. The toothed belt drive may be a synchronous belt.

Still further, the invention is directed to a method for minimizing space required for an engine in an engine compartment while delivering power to an auxiliary unit. The method includes mounting the auxiliary unit on the side of the engine, wherein an auxiliary power take-off shaft of the auxiliary unit is substantially parallel to an engine crankshaft; delivering substantially all of the power from the engine from a front end of the engine crankshaft to the auxiliary unit via a pulley and toothed belt system, wherein the pulley and toothed belt system comprises a pulley mounted on a power take-off (PTO) shaft, a sprocket mounted on the crankshaft, and a toothed belt rotatably connecting the pulley and the sprocket.

In these and other aspects of the invention, the system may be capable of transmitting substantially all of the power from the engine to the auxiliary unit. The power requirement of the auxiliary unit may be over 37.28 kilowatts (50 horsepower) and the auxiliary shaft may operate at greater than 33.33 hertz (2000 rpm). For example, the system is capable of delivering at least 80 kW (108.77 HP) at 50 hertz (3000 rpm)of the auxiliary shaft. In addition, the lateral load on the crankshaft is at least 90.72 kilograms 200 pounds), for example at least 163.29 kilograms (360 pounds).

These as well as other aspects, advantages, and alternatives, will become apparent to those of ordinary skill in the art by reading the following detailed description, with reference where appropriate to the accompanying drawings.

DESCRIPTION

Figure 1:
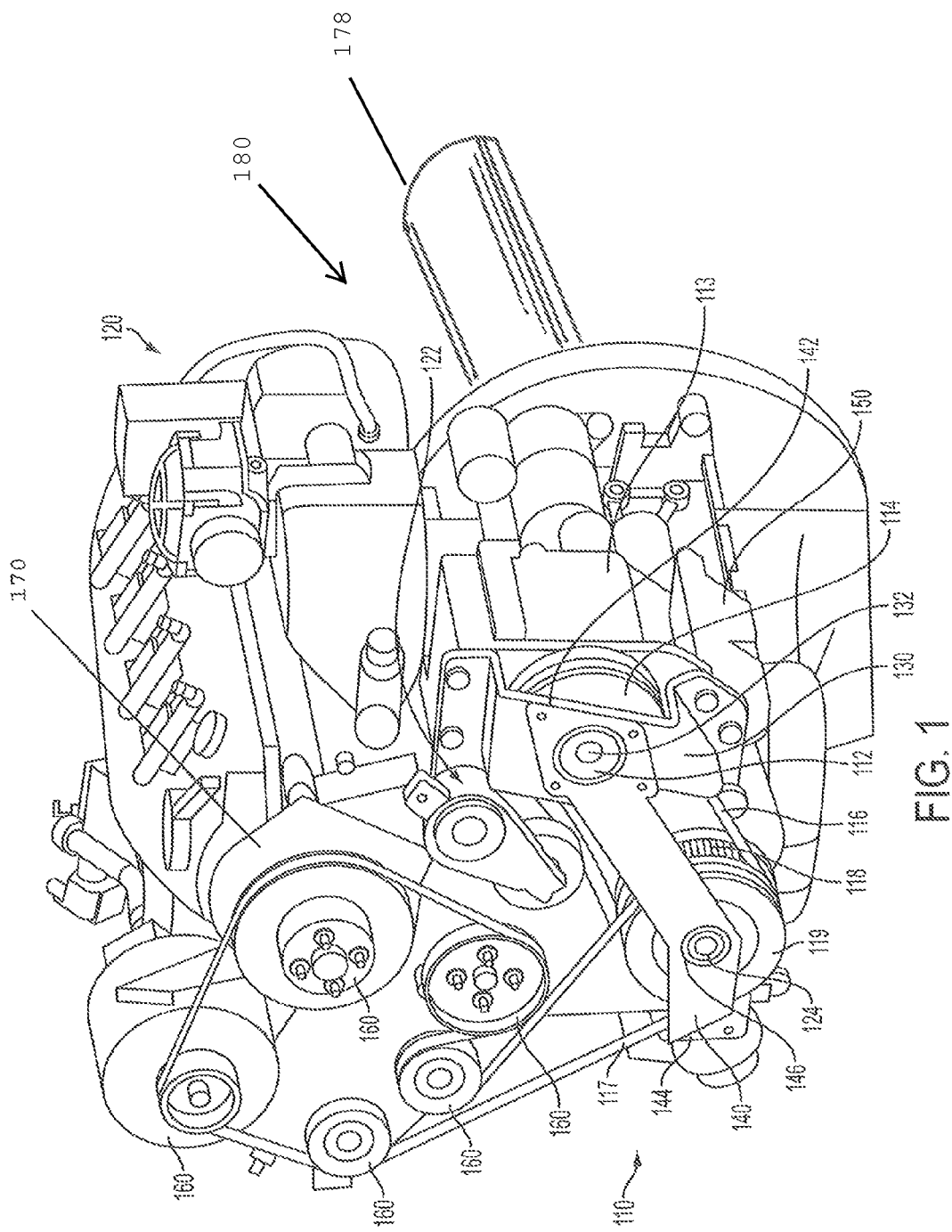
FIG. 1 illustrates an engine with a PTO system according to an exemplary embodiment.

Exemplary systems and methods are described herein. It should be understood that the word "exemplary" is used herein to mean "serving as an example, instance, or illustration." Any embodiment or feature described herein as "exemplary" or an "example" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Disclosed is a compact PTO unit and drive system suitable for front engine drive applications. The system allows substantially all of the engine torque and horsepower to be taken off the front of the engine for driving auxiliary components of a vehicle. Because the PTO unit can be mounted on the side of the engine, the unit is easily accessible and minimizes the space required for mounting the system in the engine compartment. Accordingly, the system is suitable, for example, for use with engines on vehicles with compact engine compartments. In addition, the PTO unit and drive system can be adopted on standard engine designs with space available on the crankshaft at the front 170 of the engine such that the system does not require redesign of the vehicle drive system at the rear 180 of the engine.

The maximum amount of power that can be delivered from an engine through the crankshaft to an auxiliary unit depends in part on the maximum power output of the engine. While the maximum power of engines used in industrial, agricultural and construction vehicles can vary widely, the auxiliary units typically require between 1 and 20 kilowatts kW (1.36 to 27.19 horsepower (HP)) of power. Because it is desired that engines used in these vehicles have a compact design, smaller engines that deliver less power are often used. Also, the compact nature of the engine compartment in these vehicles limits the ability of the system to deliver power to an auxiliary unit. Accordingly, it is desirable that PTO systems on these small engines are able to transfer substantially all of the engine power to the PTO unit. Most engines used in these systems have power rating of between about 14.7 and 220.65 kW (20 and 300 HP), which can span from about 54.23 to about 1355.82 newton-meters (N-m) (about 40 to about 1000 ft-lbs of torque at 11.67 to 66.67 hertz (700 to 4000 rpm). As used herein, "substantially all the power from the engine" refers to the horsepower of the engine and torque provided by the crankshaft. In various embodiments, at least 70%, at least 80%, and least 90%, at least 95%, and at least 99% of the engine horsepower and crankshaft torque is transferred to the PTO unit.

The PTO system includes a PTO unit mounted on an engine body and a shaft extending from the PTO unit spaced generally parallel to the engine crankshaft. The PTO shaft cooperates with the portion of the crankshaft extending from the front of the engine via a pulley and toothed belt drive assembly. Accordingly, PTO unit can be mounted on the side of the engine yet derive power from the front of the engine body. Moreover, the system avoids truck/frame mounted output shafts that that are not suitable for the compact space requirements of most industrial, agricultural and construction vehicles.

In addition, a PTO system on the front of an engine must be compatible with timing belt driven engines. For example, the PTO system should not require modification to the host engine or require an oil galley. Also, the system should offer less complexity for use with overhead cam systems that are used on most modern internal combustion engines in which space and physical mounting locations for the PTO system may be very limited.

FIG. 1 illustrates an engine with a power take-off (PTO) system according to an exemplary embodiment. The PTO system supplies power to vehicle auxiliaries, such as, for example, hydraulic pumps, compressors, pneumatic pumps, generators, and fans. Many of these systems have substantial power requirements, including up to several hundred horsepower. In many cases, the power requirement for the auxiliaries is essentially all of the engine power.

FIG. 1 shows a PTO system 110 mounted on an engine body 120. The PTO system 110 includes an output shaft 112, a PTO unit 113, a pulley 114, a first belt drive 116, a PTO drive sprocket 118, a first bracket 130 and a second bracket 140.

The engine 120 is typically, although not exclusively, an internal combustion engine that includes a block 122 housing a plurality of cylinders, pistons, and connecting rods, and a crankshaft 124 that turns the pistons' motion within the cylinders into circular motion. For example, the engine 120 can be any of a number of engines currently available, including inline, V, slant and boxer configurations, provided these designs provide for space on the crankshaft at the front of the engine for mounting a drive sprocket. The engine 120 may also drive a number of accessories, for example, an alternator, an air conditioner compressor, a water pump, and an air pump for emissions. While these accessories can use engine power, they do not typically require the substantial power load of an auxiliary unit described here. For instance, most accessories, even in combination with other accessories, use less than 50% of an engine's power. The engine 120 is usually the power source for both the accessories and any auxiliaries during vehicle operation.

The engine power is taken from the crankshaft 124 at the front of the engine, which is typically the weaker side of the crankshaft 124. In the example of FIG. 1, the PTO unit 113 is mounted via a framework 150 on the side of the engine body 120, adjacent a sidewall of the engine block. The framework 150 may include brackets or other support structures, and may be removably bolted directly onto the sidewall of the engine body 120. In addition, another mounting element may also help to secure the PTO unit to the engine body 120. For example, the framework 150 may include a base or platform for supporting thereon the various mechanical elements that include the PTO unit 113.

The output shaft 112 for the auxiliary unit extends from the PTO unit 113 in a direction generally parallel to the crankshaft and toward the front of the engine body 120. The pulley 114 is mounted and rotationally fixed to the output shaft 112. The drive sprocket 118 is mounted and rotationally fixed to the engine crankshaft 124. The drive belt 116 transfers power from the drive sprocket 118 to the pulley 114. Typically, the ratio between the drive sprocket 118 and the pulley 114 is between about 1:3 to about 3:1.

In one example embodiment, the drive sprocket 118 and the pulley 114 may each include a toothed edge and the first belt drive 116 may include corresponding teeth that mate with the toothed edge for more controlled movement of the first belt drive 116 on the drive sprocket 118 and the pulley 114. For instance, the drive belt 116 may be a synchronous drive belt having polyurethane construction with carbon fiber cords and nylon teeth, and that does not require lubrication and avoids the need for an oil galley. In one example, the drive belt is a POLY CHAIN® GT® Carbon™ belt drive (Gates, Inc., Denver Colo.), which has a carbon fibre tensile cord construction. Compared to a traditional Morse chain drive, the belt drive provides less vibration, can be operated at higher RPM, and results in less lateral load than the crankshaft. A tensioning system 122 may be used to provide the appropriate tension to the belt drive 116. Also, the tension of the belt can be addressed in the design of the framework 150 such that the distance between the crankshaft 124 and the output shaft 112 is correct for the particular belt used.

An accessory drive sprocket 119 may also be mounted to the crankshaft 124. The accessory drive sprocket 119 may be positioned adjacent to the auxiliary drive sprocket 118 to allow for a compact configuration. A second belt drive 117 may be positioned on an edge of the accessory drive sprocket 119 such that the rotation of the accessory drive sprocket 119 drives one or more accessories. For example, the second belt drive 117 may be positioned on or around various portions of one or more pulleys 160 such that the movement of the second belt drive 117 causes rotation of the plurality of the pulleys 160 that in turn run accessories off of the engine power. Some pulleys 160 may not run any accessories but may be tensioning pulleys that provide the proper tension in the second belt drive 117 as the belt moves. In one example embodiment, the accessory drive sprocket 119 may include a toothed edge and the second belt drive 117 may include corresponding teeth that mate with the toothed edge for more controlled movement of the second belt drive 117 on the accessory drive sprocket 119.

In one aspect, the system includes a structure to support either one or both of the crankshaft and the auxiliary shaft against the lateral load exerted by the belt drive. For example, the structure may include a bracket that receives the front end of the crankshaft, which can cooperate with a bearing (e.g., roller needle, ball, or journal bearing) associated with the bracket. Similarly, the structure may include a bracket that receives the auxiliary shaft, which can cooperate with a bearing (e.g., roller needle, ball, or journal bearing) associated with the bracket. For example, FIG. 1a shows a first bracket 130 connected to the framework 150 and spanning the outer surface of the pulley 114. The first bracket 130 has a bearing 132 that cooperates with the output shaft 112 and serve to support the output shaft 112 against a lateral load.

Also, as show in the exemplary embodiment shown in FIG. 1, a second bracket 140 may attach at a first end 142 to the first bracket 130 and at a second end 144 may attach to another part of the engine body 120. The second bracket 140 retains and supports the crankshaft 124 in cooperation with a bearing 146 against the transverse loading on the crankshaft 124. Each of the first bracket 130 and the second bracket 140 is suitable for easy accessibility and installation as each bracket is installed at the front end of the engine body 120 via a simple bolt attachment or other methods common to the industry. In configurations that transfer over 80 kW of power from the crankshaft to the PTO unit, the side load on the crankshaft can be up to 400 lbs with the use of the toothed belt described herein. Therefore, the brackets can provide a substantial reduction in load on the crankshaft, which allows for greater power transfer from the engine to the PTO unit without crankshaft failure. FIG. 1 is exemplary only, and several methods of securing the brackets to support the crankshaft and the auxiliary shaft can be used as long as they are suitable for compact engine compartments.

The drive sprocket 118 should be mounted to the crankshaft 124 in a manner that allows for a substantial load, for example nearly 100% of the engine power, to be transferred to the PTO unit. In a typical operation, the load can range from 27.12 to 1355.82 N-m (20 to 1000 ft-lbs), which can result in a large stress on the crankshaft 124. In some embodiments, the drive sprocket 118 is press-fit on the crankshaft 124, which can cause additional stress on the crankshaft. In one embodiment, the crankshaft 124 may include a woodruff key that is received within an annular keyway in the drive sprocket 118. In a typical embodiment, the woodruff key is restrained in a curved keyway in the crankshaft 124. In some instances, the woodruff key may be press fit within the crankshaft keyway.

The system 100 of FIG. 1 is able to deliver substantially all of the power from the engine to the PTO unit 113, while not fatiguing the crankshaft 124. Although the weaker side of the crankshaft is being used in the system 100 to drive power to engine auxiliaries, the present configuration allows the crankshaft 124 the ability to handle the power needed to drive one or more auxiliaries, which may require substantially all of the power from the engine, while minimizing the side load on the crank.

In one aspect, the invention is directed to a method of minimizing the space needed in an engine compartment while taking power from the engine to run auxiliary units. The method includes mounting the auxiliary unit on the side of the engine, wherein the power take-off shaft of the auxiliary unit is substantially parallel to an engine crankshaft. The engine can then deliver substantially all of the power from the engine from a front end of the engine crankshaft to the auxiliary unit via a system that includes a pulley mounted on a power take-off (PTO) shaft, a sprocket mounted on the crankshaft, and a toothed belt connecting the pulley and the sprocket. In some embodiments, the toothed belt system uses a synchronous belt drive. A tensioning system as known to one of skill in the art can be used in conjunction with the belt drive.

Figure 2:
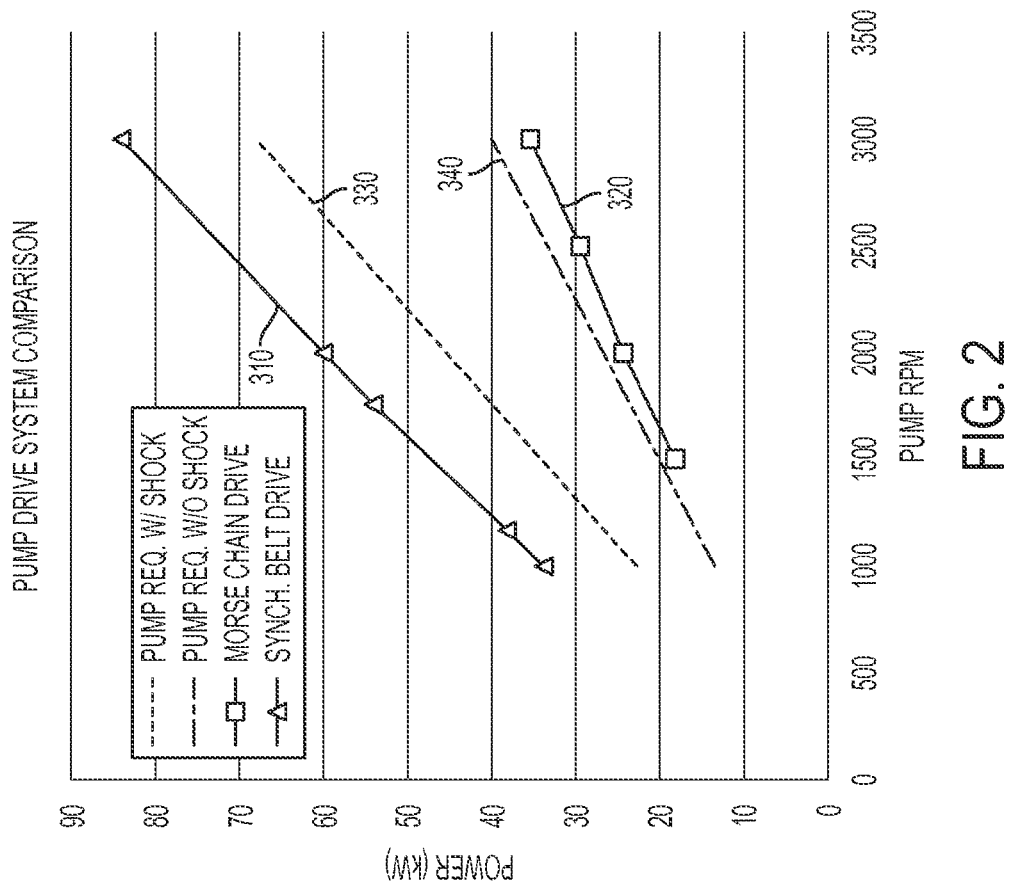
FIG. 2 is a graph comparing the power delivered to an auxiliary pump unit by a Morse chain drive and a synchronous belt drive PTO system.

FIG. 2 shows results from testing a PTO system with a synchronous belt drive, such as the system 100 of FIG. 1, and a traditional Morse chain drive PTO system. The graph shows the amount of power (kW) delivered to an auxiliary hydraulic pump at the maximum pump load. The pump ran at 19.65 megapascals (2850 PSI) with a flow rate of 97.29 liters per minute (25.7 gallons per minute). Also represented in FIG. 2 are pump requirements with and without shock, which represents the safety factor for a particular load.

As shown in FIG. 2, the PTO assembly with a synchronous belt system (POLY CHAIN® GT® Carbon™ belt drive (Gates, Inc.)) can outperform a traditional Morse chain drive system. For the synchronous belt system, a 6.35 centimeter (cm) (2.5 inch (in)) pulley on the PTO shaft and a 2.75 drive sprocket (ratio=1:1.1) allowed for over 80 kW (108.77 HP) power to be delivered at 50 hertz (3000 rpm) of the pump. The synchronous belt drive system was mounted on a Mitsubishi 4G64 2.4 spark ignited engine rated at ~59.66 kW (80 HP) and 189.81 N-m (140 ft-lb) of torque.

In comparison, a chain drive system mounted on a Nissan fuel-injected K21s engine, which produces 44.20 kW (60.1 HP) at 45 hertz (2,700 rpm) and 159.99 N-m (118ft-lb) of torque at 33.33 hertz (2,000 rpm), can only provide about 35 kW (47.59 HP) of power at 50 hertz (3000 rpm) of the pump. As shown in FIG. 2, this system does not meet the minimum requirement of 40 kW (53.62 HP) of power at 50 hertz (3000 rpm) for the pump tested with the synchronous belt drive (without shock). Nor did the chain drive meet the minimum requirement of about 68 kW (92.45 HP) at 50 hertz (3000 rpm) for the pump (with shock). In contrast, the synchronous belt configuration exceeded the pump power requirements with and without shock. FIG. 2 illustrates how traditional chain drive systems, such as the Morse chain system, are less suitable for high RPM, high power applications.

Additionally, in the front PTO example represented in FIG. 2, the 2.5 inch pulley of the synchronous belt drive PTO system resulted in 79 kg (175 lbs) of pump off load and 158 kg (350 lbs) of maximum pump on load (at 50 hertz (3000 rpm)) on the crank shaft. The Morse chain drive, however, results in about 240 kg (530 lbs) of side load on the crankshaft at 50 hertz (3000 rpm), which is likely to result in a crankshaft failure. While this load could be likely be reduced by a larger sprocket on the crankshaft, the unavailability of space in an engine compartment to accommodate a larger oil galley prevents the use of the larger sprocket in most front PTO configurations.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims

The invention claimed is:

1. A system for driving a hydraulic pump for powering auxiliaries on a vehicle, comprising:
   an engine comprising a vehicle drive system end comprising a vehicle drive system and an auxiliary drive system end, wherein the engine comprises an engine block and a crankshaft,
   a drive sprocket mounted on a portion of the crankshaft extending from the auxiliary drive system end of the engine;
   an auxiliary shaft for driving the hydraulic pump for powering vehicle auxiliaries, wherein the hydraulic pump is mounted on a side of the engine block between the the auxiliary drive system end and the vehicle drive system end of the block, and wherein the auxiliary shaft extends from the hydraulic pump toward the auxiliary drive system end of the engine and is spaced in fixed and parallel relation to the crankshaft;

an auxiliary pulley mounted on the auxiliary shaft that is adapted for driving the hydraulic pump;

a toothed drive belt interconnecting the drive sprocket and the auxiliary pulley to transmit power from the drive sprocket to the pulley; and a support structure that supports the crankshaft and the auxiliary shaft against a transverse load asserted by the drive belt, wherein the system is capable of transmitting substantially all of the power from the engine to the hydraulic pump.

2. The system of claim 1, wherein the toothed belt is a synchronous belt.

3. The system of claim 1, wherein at least 70% of the engine horsepower and crankshaft torque is transferred to the hydraulic pump.

4. The system of claim 1, wherein the power requirement of the hydraulic pump is over 50 horsepower.

5. The system of claim 1, wherein the drive sprocket is press fit on to the crankshaft.

6. The system of claim 1, wherein the auxiliary shaft operates at greater than 2000 RPM.

7. The system of claim 1, wherein the lateral load on the crankshaft is at least 200 pounds.

8. The system of claim 1, wherein the system is capable of delivering at least 80kW at 3000 RPM of the auxiliary shaft.

9. The system of claim 1, further comprising a second sprocket mounted adjacent the drive sprocket and a belt mounted on the second sprocket interconnecting the second sprocket and at least one second pulley that drives at least one vehicle accessory.

* * * * *